(12) United States Patent
Larsen (10) Patent No.: US 12,550,838 B2
(45) Date of Patent: Feb. 17, 2026

(54) DEVICES, SYSTEMS, AND METHODS FOR IRRIGATION CONTROL

(71) Applicant: Smart Rain Systems, LLC, Centerville, UT (US)

(72) Inventor: Rudy Lars Larsen, Bountiful, UT (US)

(73) Assignee: Smart Rain Systems, LLC, Centerville, UT (US)

( * ) Notice: Subject to any disclaimer, the term of this patent is extended or adjusted under 35 U.S.C. 154(b) by 341 days.

(21) Appl. No.: 18/072,379

(22) Filed: Nov. 30, 2022

(65) Prior Publication Data

US 2024/0172608 A1    May 30, 2024

(51) Int. Cl.
*A01G 25/16*    (2006.01)
(52) U.S. Cl.
CPC ................................. *A01G 25/165* (2013.01)
(58) Field of Classification Search
CPC ..... A01G 25/165; A01G 25/167; A01G 25/16
See application file for complete search history.

(56) References Cited

U.S. PATENT DOCUMENTS

| | | | |
|---|---|---|---|
| 10,101,753 B1* | 10/2018 | Levine | A01G 25/165 |
| 2009/0099701 A1* | 4/2009 | Li | A01G 25/16 700/284 |
| 2012/0239211 A1* | 9/2012 | Walker | G05B 13/021 700/284 |
| 2020/0077574 A1* | 3/2020 | Bull | G06Q 10/0635 |
| 2021/0392830 A1* | 12/2021 | Weiler | A01G 25/165 |

\* cited by examiner

*Primary Examiner* — Chad G Erdman
(74) *Attorney, Agent, or Firm* — RAY QUINNEY & NEBEKER; Thomas L. Lingard (57) ABSTRACT

An irrigation manager may receive, from a mobile device, a job status notification for a job within a watering area, the job status notification including job information and location information. An irrigation manager may, based on the job status notification, determine, within the watering area, an irrigation zone associated with a local irrigation controller in which the job is located. An irrigation manager may, based on the job information, generate irrigation instructions for the irrigation zone. An irrigation manager may transmit the irrigation instructions from the irrigation manager to the local irrigation controller.

20 Claims, 6 Drawing Sheets

DEVICES, SYSTEMS, AND METHODS FOR IRRIGATION CONTROL

CROSS-REFERENCE TO RELATED APPLICATIONS

N/A.

BACKGROUND

Irrigation systems provide water to plants from a main water line, or water main. The water main has a capacity, which is typically measured in terms of a volumetric flow rate, such as gallons per minute (GPM). The water main capacity may be measured using other hydraulic parameter, such as pressure. Some irrigation systems may use one or more irrigation devices, such as a sprinkler head. These may help to deliver the irrigation water over an area. In some situations, the watering area to be irrigated (or watered) may utilize more water than is available from the water main. To water the entire watering area, an irrigation operator may separate this area into two or more zones. The irrigation devices in the zones may be connected the water main through a valve. The valve may be opened and closed using an irrigation controller.

In some situations, an irrigation controller may control multiple zones. For example, an irrigation controller may control 2, 3, 4, 5, 6, 7, 8, 9, 10, 15, 20, 30, 40, 50, or more zones. In some situations, the watering area may include more zones than a single irrigation controller may control. To irrigate the entire watering area, an irrigation operator may utilize multiple irrigation controllers. The irrigation controllers are typically installed at or near the physical location of their respective zones, thereby reducing the piping and/or wiring between the controller and the irrigation devices.

The irrigation operator may coordinate the operation of zones between the irrigation controllers. For example, the irrigation operator may plan which zones provide water for a particular period of time. In some situations, the irrigation operator may individually program each of the zones on each of the irrigation controllers. This may involve travelling to each of the irrigation controllers to program the irrigation controllers. However, this may be time-consuming. Further, individually programming the irrigation controllers may result in errors and/or be unresponsive to changing irrigation conditions.

An irrigation system may involve maintenance, adjustments, upgrades, new plants, new irrigation devices, and so forth. These irrigation jobs may be performed by an operations crew. Many irrigation jobs may involve adjustments to the irrigation system. For example, an irrigation job may involve planting a new plant, and the new plant may need additional watering to survive. The additional watering may be in addition to the irrigation program for the zone in which the job was performed. In some situations, the irrigation system may not receive the adjustments to the irrigation system, resulting in damage to plants and/or irrigation equipment. Accordingly, there is a need for integrated irrigation management between operations and the irrigation controller.

BRIEF SUMMARY

In some aspects, the techniques described herein relate to a method for irrigation control implemented on an irrigation manager. The method includes receiving, at the irrigation manager from a mobile device, a job status notification for a job within a watering area. The job status notification includes job information and location information. Based on the job status notification, the irrigation manager determines, within the watering area, an irrigation zone associated with a local irrigation controller in which the job is located. Based on the job information, the irrigation manager generates irrigation instructions for the irrigation zone and transmits the irrigation instructions from the irrigation manager to the local irrigation controller.

In some aspects, the techniques described herein relate to a method for irrigation control implemented on an irrigation manager. The method includes receiving, at the irrigation manager from a cloud-based irrigation controller, irrigation information for a plurality of irrigation zones in a watering area. The irrigation manager receives, from a mobile device, job information for an irrigation job in the watering area. Based on the irrigation information and the job information, the irrigation manager determines an irrigation zone of the plurality of irrigation zones in which the irrigation job is performed. Based on the irrigation information and the job information, the irrigation manager determines whether an irrigation program for the irrigation zone is sufficient. If the irrigation program is not sufficient, the irrigation manager generates irrigation instructions for the irrigation zone.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for irrigation control of a cloud-based irrigation system. An irrigation manager may receive job information from a cloud-based operations controller. The job information may include completion information for an irrigation job. For example, the job information may include plant information for a particular irrigation job. The plant information may include a type of plant planted, a number of plants planted, any other plant information, and combinations thereof. The irrigation manager may further receive location information for the irrigation job. The irrigation manager may receive irrigation information from an irrigation database. Based on the irrigation information, the job information, and the location information, the irrigation manager may generate irrigation instructions for the irrigation zone that the irrigation job was located in. This may allow the irrigation manager to integrate the operations work with the irrigation system. This may help to reduce or prevent damage or irrigation systems, plants, or other elements of an irrigation system.

In accordance with at least one embodiment of the present disclosure, the irrigation manager may determine the local irrigation controller and the local irrigation zone in which the job was completed. For example, the irrigation manager may utilize location information from an irrigation job to determine to which irrigation zone and/or local irrigation controller the job was performed. In some examples, the irrigation manager may use GPS location information of a mobile device used track the irrigation job to determine which irrigation zone and/or local irrigation controller the job was performed. In some examples, the irrigation manager may use GPS location information from the mobile device when the job is performed and/or when the job is completed. Using the location information, the irrigation manager may determine the zone without explicit input from the user. This may help to improve the accuracy and/or quality of the irrigation instructions the irrigation manager generates for the irrigation zone and/or the irrigation controller.

As illustrated by the foregoing discussion, the present disclosure utilizes a variety of terms to describe features and advantages of the cloud-based irrigation system. Additional detail is now provided regarding the meaning of such terms. For example, as used herein, the term "cloud-based" refers to a system that is at least partially implemented on the cloud. In particular, the term cloud-based can include any system or program that is implemented on a remote computing device. In some embodiments, the remote computing device may be a server on a server farm. In some embodiments, a cloud-based system may include a system implemented over the internet. For example, the cloud-based system may be in communication over the internet with local computing devices, such as local irrigation controllers.

The term "irrigation controller" may refer to an irrigation device that controls the flow of water to various zones. For example, the irrigation controller may be in control of various valves and other flow control devices, the actuation of which may cause water to flow to the various connected zones. In some embodiments, the irrigation controller may be programmable. For example, the irrigation controller may be programmable to adjust the sequence and/or timing of actuation of the valves and/or zones. In some embodiments, the irrigation controller may be in communication with one or more remote devices (e.g., via the internet). In some embodiments, the irrigation controller may not be in direct communication with any remote devices. In some embodiments, the irrigation controller may be in indirect communication with the one or more remote devices.

The term "irrigation job" may refer to any work performed within an irrigation system. An irrigation job may include physical equipment, such as irrigation devices, sensors, valves, piping, irrigation controllers, any other equipment, and combinations thereof. An irrigation job may include the replacement of, addition of, removal of, connections between, any other work on physical equipment, and combinations thereof. In some embodiments, an irrigation job may include plants. For example, the irrigation job may include the replacement of, addition of, removal of, pruning of, fertilizing of, any other work on plants, and combinations thereof. In some embodiments, the irrigation job may include the rearrangement of zones. For example, the irrigation job may include re-routing piping between valves to adjust which zones particular plants or sets of plants are located. In some embodiments, an irrigation job may include any other work performed in an irrigation system.

Figure 1:
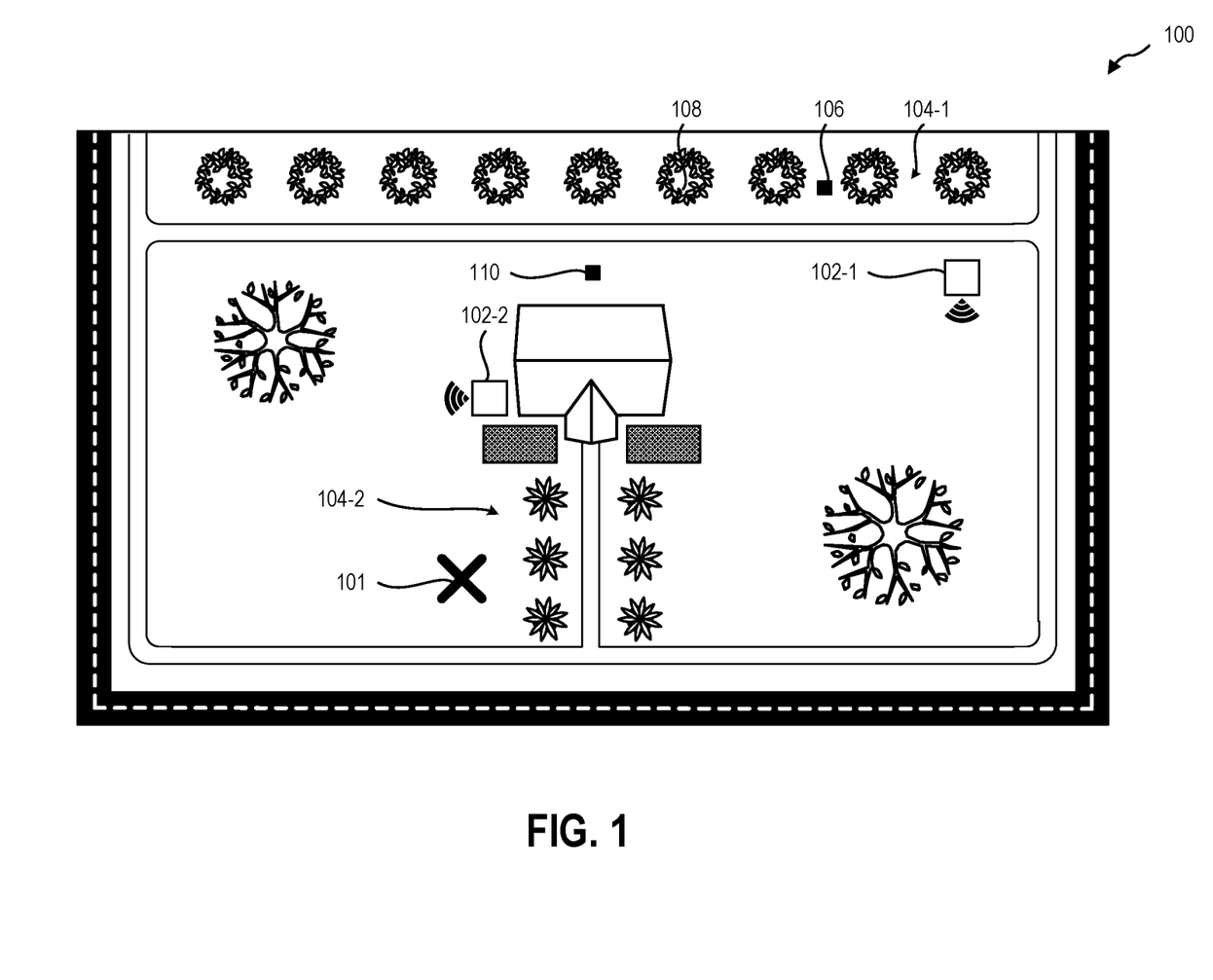
FIG. 1 is a representation of a cloud-based irrigation system, according to at least one embodiment of the present disclosure.

FIG. 1 is a representation of a cloud-based irrigation system 100, according to at least one embodiment of the present disclosure. The cloud-based irrigation system 100 includes a plurality of irrigation controllers (collectively 102). The irrigation controllers 102 may control the watering for a watering area. The watering area may include one or more watering zones (collectively 104). Each watering zone may include one or more irrigation devices 106. The irrigation devices 106 may provide water to one or more plants 108. The irrigation devices 106 may include any type of irrigation device, such as a spray head, a rotary head, a drip irrigation device, any other type of irrigation device, and combinations thereof. In some embodiments, an irrigation device 106 may water a single plant 108. In some embodiments, an irrigation device 106 may provide water to multiple plants 108. The plants 108 may include any type of plant, such as grass, shrubs, flowers, trees, garden plants, crops, any other type of plant, and combinations thereof.

Different irrigation controllers 102 may provide water to different irrigation zones 104. For example, a first irrigation controller 102-1 may control the irrigation to a first zone 104-1 and a second irrigation controller 102-2 may control the irrigation to a second zone 104-2. While two irrigation controllers 102 are shown each controlling a single zone 104, it should be understood that the watering area may include any number of irrigation controllers 102 watering any number of zones 104. For example, a single irrigation controller 102 may control 48 zones or any number of zones 104. In some examples, a single irrigation controller 102 may control a single zone 104.

The irrigation controllers 102 may include any type of irrigation controller. For example, the irrigation controllers 102 may include a single-wire irrigation controller, with multiple valves or other irrigation devices connected to a single common wire. In some examples, the irrigation controllers 102 may include a "two-wire controller." A two-wire controller may connect multiple valves or other irrigation devices in series. A two-wire controller may allow for an increased number of connected valves. In some embodiments, the irrigation controllers 102 may include a wireless irrigation controller. For example, the irrigation controllers 102 may wirelessly connect to the valves and other connected irrigation devices. In some embodiments, the irrigation controllers 102 may include any type of irrigation controller connected to one or more valves in any way, including wired connections having any configuration, wireless connections, and combinations thereof. In some embodiments, the cloud-based irrigation system 100 may include multiple types of irrigation controllers 102.

The irrigation controllers 102 may include local irrigation programs for their associated zones 104. In some embodiments, an irrigation program may include a time of day to water for a particular zone 104 and/or set of zones 104. In some embodiments, an irrigation program may include a duration to water for a particular zone 104 and/or set of zones 104. In some embodiments, an irrigation program may include times during which to collect irrigation conditions from one or more sensors 110, as discussed herein. In some embodiments, the irrigation program may be a local irrigation program associated with the particular irrigation controller 102. In some embodiments, a local irrigation program may include controls for any other operation or combinations of operations performed by the irrigation controller 102.

In some embodiments, a single zone 104 may utilize all of the water provided by a water main. In some embodiments a single zone 104 may utilize a portion of the water provided by the water main. A zone 104 may be provided for a group of plants having similar watering patterns. In some examples, the zone 104 may be provided for a group of the same plant. In some embodiments, the zone 104 may be provided based on the capacity of the water main and the water usage of the irrigation devices 106. For example, a grassy field may include multiple zones 104, each of which max out the water main.

In some embodiments, selecting which zones 104 are simultaneously actuated may be referred to as "stacking" the irrigation system. Stacking the zones 104 may be based on any irrigation factor. For example, the zones 104 may be stacked to use all or most of the available water supply from the water main. This may result in zones 104 that are not adjacent to each other to be part of the same stack. In some examples, stacked zones 104 may have the same irrigation duration. In some examples, stacked zones 104 may have different durations. This may result in a first zone being actuated while a second zone is still running. In this manner, different zones having different durations may be stacked to reduce the opportunity costs of lost water supply from the water main.

In some embodiments, a stack may be a cross-controller stack that include two zones 104 associated with different irrigation controllers 102. For example, the first zone 104-1 and the second zone 104-2 may be simultaneously actuated as part of the same stack. Actuating zones 104 from different irrigation controllers 102 may allow the irrigation operator to utilize all of the water supply from the water main.

In accordance with at least one embodiment of the present disclosure, the cloud-based irrigation controller may prepare a cross-controller stack for zones that are associated with irrigation controllers 102 tethered to the cloud-based irrigation controller. For example, the cloud-based irrigation controller may review the zones 104, including the water consumption and other irrigation properties of the zones 104. Based on the irrigation properties, the cloud-based irrigation controller may prepare the cross-controller stack.

In some embodiments, when the cloud-based irrigation controller sends the irrigation instructions to the irrigation controllers 102, as discussed in further detail herein, the cloud-based irrigation controller may instruct the irrigation controllers 102 consistent with the cross-controller stack. In some embodiments, the cloud-based irrigation controller may send the entire cross-controller stack to each of the tethered irrigation controllers 102. In some embodiments, the cloud-based irrigation controller may only send the relevant instructions to the tethered irrigation controllers 102.

In some embodiments, the cloud-based irrigation controller may prepare a new stack based on new information received by the irrigation controllers 102 and/or the cloud-based irrigation controller. For example, the cloud-based irrigation controller may receive sensor information indicating that a particular zone 104 could use more water. The cloud-based irrigation controller may increase the watering duration for the zone 104. Based on the increase in watering duration for the zone 104, the cloud-based irrigation controller may adjust the cross-controller stack. For example, the cloud-based irrigation controller may adjust the day and/or the time of day for watering the zone. In some examples, the cloud-based irrigation controller may adjust which zones are simultaneously actuated with the particular zone. In this manner, the cloud-based irrigation controller may maintain the water usage of the cross-controller stack and reduce or prevent over-dedication of the water usage and/or lapses in full usage of the water supply.

As may be seen, the irrigation controllers 102 may be physically located within one of the zones 104 they control and/or proximate one or more of the zones 104 they control. For example, the first irrigation controller 102-1 is shown as proximate to the first zone 104-1. The second irrigation controller 102-2 is shown as proximate to the second zone 104-2. The irrigation controllers 102 may be located within or proximate the single zone 104 to reduce the wiring length and/or the piping to the valves and/or irrigation devices 106 of the respective zones. As discussed herein, to adjust the programming of the irrigation controllers 102, the irrigation operator may physically interact with the irrigation controllers 102, which may take time, effort, and money for the irrigation operator.

The cloud-based irrigation system 100 may include one or more sensors 110. The sensors 110 may detect irrigation conditions of the cloud-based irrigation system 100. For example, the sensors 110 may detect irrigation conditions of plants and/or soil in the watering area. For example, the sensors 110 may detect soil moisture, soil pH, soil chemistry, and other irrigation conditions of the plans and/or soil in the watering area. In some examples, the sensors 110 may detect flow rate information for one or more of the zones 104 and/or irrigation devices 106. In some examples, the sensors 110 may detect pressure information for one or more of the zones 104 and/or irrigation devices 106. In some examples, the sensors 110 may collect weather information. For example, the sensors 110 may detect temperature, humidity, rainfall, wind speed, wind direction, barometric pressure, any other weather information, and combinations thereof. In some embodiments, the sensors 110 may collect photographic information of all or a portion of the watering area.

For example, the sensors 110 may collect photos of a patch of grass or plants. Plants may change colors based on over-watering, under-watering, nutrient levels, the presence of pests, the presence of weeds, temperature, any other condition, and combinations thereof.

In some embodiments, the sensors 110 may be in communication with the irrigation controllers 102. For example, one or more of the sensors 110 may be located within a zone associated with a particular irrigation controller 102, and the sensors 110 may be in communication (e.g., wired or wireless communication) with the irrigation controller 102. Put another way, the sensors 110 may communicate (e.g., wired or wirelessly) with the irrigation controllers 102. In some embodiments, the sensors 110 may receive power from the associate irrigation controller 102.

In accordance with at least one embodiment of the present disclosure, the irrigation controllers 102 may be in communication with the internet. Put another way, the irrigation controllers 102 may include a communication device that connects the irrigation controllers 102 to the internet. In some embodiments, the irrigation controllers 102 may have two-way communication with the internet. In some embodiments, the irrigation controllers 102 may be tethered to a cloud-based irrigation controller. For example, the irrigation controllers 102 may be tethered to the cloud-based irrigation controller over the internet. The cloud-based irrigation controller may receive irrigation information from the irrigation controllers 102 and provide irrigation instructions to the irrigation controllers 102.

While irrigation controllers 102 are described and illustrated as being in communication over the internet, it should be understood that the irrigation controllers may operate independent of the internet. For example, the irrigation controllers 102 may include local memory. The local memory may include the irrigation program for the local irrigation controller 102. The local irrigation controller 102 may implement the irrigation program from the local memory. This may help to reduce data usage and bandwidth requirements for the local irrigation controller 102. In some embodiments, if the local irrigation controller 102 is disconnected from the internet (for any reason), the local irrigation controller may still implement the local irrigation program. This may help to provide redundancy in the cloud-based irrigation system.

As discussed herein, the irrigation program may be stored on the local memory. In some embodiments, the local irrigation controller 102 may not be able to make changes to the irrigation program stored on the local memory. For example, an irrigation operator may not be able to adjust the irrigation program stored on the local memory. In some embodiments, the irrigation program may only be changed from an internet connection. In some embodiments, the irrigation program may be changed locally after receiving approval from the cloud-based irrigation controller to which the local irrigation controller 102 is tethered. This may help to prevent unintentional and/or unauthorized changes to the irrigation program.

In some embodiments, the irrigation controllers 102 may be constantly connected to the internet (except for unexpected internet outages). In some embodiments, the irrigation controllers 102 may periodically or episodically connect to the internet. For example, the irrigation controllers 102 may periodically connect to the internet every second, every 10 seconds, every 30 seconds, every minute, every 10 minutes, every 30 minutes, every hour, every 12 hours, every day, every week, every month, every season, every year, or any timeframe therebetween. In some embodiments, the irrigation controllers may episodically connect to the internet when an event occurs, such as when new equipment is installed, an alarm is triggered, a user instructs that irrigation controller, a certain amount of irrigation information has been collected, any other episode, and combinations thereof.

In some embodiments, the local memory may include a storage cache. The storage cache may store irrigation information collected by the local irrigation controller 102. In some embodiments, the local storage may store irrigation information until the irrigation information is uploaded to the cloud-based irrigation controller. For example, the local storage may store the irrigation information collected during an interruption to internet service, and may upload the irrigation information when internet service is restored. In some example the local storage may store the irrigation information between periodic or episodic internet connections, and may upload the stored irrigation information at the time of connection to the internet.

As discussed herein, the irrigation controllers 102 may provide the cloud-based irrigation controller with irrigation information. In some embodiments, the irrigation information may include irrigation conditions detected by the sensors 110. In some embodiments, the irrigation information may include details of the operation of the irrigation controllers 102. For example, the irrigation information may include the time a zone is water, the duration that a zone is watered, the flow rate associated with a zone, the pressure drop associated with a zone, any other information, and combinations thereof.

In some embodiments, the cloud-based irrigation controller may generate irrigation instructions and provide them to the tethered irrigation controllers 102. For example, the irrigation instructions may include a change to the irrigation program for one or more of the irrigation controllers 102. In some examples, the cloud-based irrigation controller may provide instructions regarding the time of day one or more zones 104 waters and/or the duration that one or more zones 104 waters.

The cloud-based irrigation controller may generate irrigation instructions using the irrigation information. For example, the cloud-based irrigation controller may generate the irrigation instructions based on the irrigation information received from the irrigation controllers 102. In some examples, the cloud-based irrigation controller may generate the irrigation instructions based on sensor readings from the sensors 110. The irrigation instructions may be at least partially based on the irrigation information. For example, the irrigation instructions may adjust a watering day, time of day and/or duration based on the irrigation information. In some examples, the irrigation instructions may adjust a watering day, time of day and/or duration based on irrigation conditions.

In some embodiments, the cloud-based irrigation controller may generate a master irrigation program. The master irrigation program may include watering days, times of day, and durations for the zones 104 in the watering area. For example, the master irrigation program may include watering days, times of day, and durations for each zone 104 associated with each irrigation controller 102 tethered to the cloud-based irrigation controller.

The master irrigation program may coordinate the watering between the various irrigation controllers 102 and zones 104. For example, the master irrigation program may coordinate the flow from the water main, improving use of the water supply during the watering window. In some embodiments, the master irrigation plan may be flexible and adaptable based on the changing irrigation conditions of the entire watering area. In this manner, the watering efficiency of the watering area may be improved, which may save money, water, and/or time.

In some embodiments, an operations crew may perform one or more irrigation jobs within the watering area of the cloud-based irrigation system 100. The irrigation job may be performed at a job location 101. The job location 101 may be determined in any manner. For example, the job location 101 may be determined based on an input of an operations crewmember into a mobile device. In some examples, the job location 101 may be determined based on an input into a remote computing device. For example, a web application may include an input for a job location, and the remote computing device may be a remote computing device operated by a manager or operator at an office or other location remote from the job. The job location 101 may be determined based on a GPS location. For example, the job location 101 may be determined based on a GPS location of a mobile device of an operations crewmember. In some examples, the job location 101 may be determined based on a GPS location of the mobile device of the operations crewmember while the irrigation job is being completed. In some examples, the job location 101 may be determined based on a GPS location of the mobile device of the operations crewmember when the operations crewmember indicates that the irrigation job is complete.

In some embodiments, the job location 101 may be determined based on a GPS location specific to a particular plant or irrigation device. For example, after the operations crewmember plants a plant, he or she may request, from an operations application on the mobile device, a GPS location of that plant. The operations application may associate the GPS location with the plant.

In some embodiments, the job location 101 may be a part of a job ticket from a cloud-based operations controller. A job ticket may include job information about the irrigation job. The operations crewmember may review the job ticket to determine the job information about the irrigation job. In some embodiments, the operations crewmember may determine the location of the job from the job information in the job ticket. In some embodiments, the operations crewmember may insert the job location 101 into the job ticket. In some embodiments, the job ticket may receive the job location 101 from the cloud-based operations controller.

In some embodiments, the job location 101 may be located within a zone 104. For example, in the embodiment shown, the job location 101 is physically located within the second zone 104-2. In some embodiments, because the job location 101 is located within the zone 104, the work performed may be associated with that zone. For example, because the job location 101 of an irrigation job is located within the second zone 104-2, the work performed may be watered with the second zone 104-2. In some examples, the irrigation job may include a new plant planted at the job location 101. Because the new plant is located within the job location 101, the new plant may be watered by the second zone 104-2. In some examples, the work performed may include the installation of new hardware. The new hardware may be associated with the particular zone 104 based on the job location 101.

In some embodiments, the work performed may be associated with a particular zone 104 based on the job ticket. For example, the job ticket may include an instruction to add an irrigation device 106 to a particular zone 104, and/or re-route the piping between zones 104.

In some embodiments, the work performed may be located within two overlapping zones 104. For example, the work performed may be related to a tree that is watered separately from a field of grass in which the tree is planted. The job ticket may override the determined zone 104 from the job location 101. In some embodiments, the job ticket may include the plant type. The irrigation manager may determine to which zone 104 the irrigation job at the job location 101 is based on the plant type. For example, the irrigation manager may determine that a tree should be connected to a zone 104 that irrigates one or more trees.

In some embodiments, the irrigation manager may determine that the job location 101 is located within the influence of a particular irrigation controller 102. For example, the irrigation manager may determine that the job location 101 is located within a zone 104 associated with the irrigation controller 102. In some examples, the irrigation manager may determine that the job location 101 is located within the influence of the particular irrigation controller 102 using any of the mechanisms discuss above with respect to determining the zone 104 in which the job location 101 is located and/or the irrigation job is associated.

In some embodiments, the irrigation manager may, based on the job location 101 and/or the job information, generate irrigation instructions for the associated zone 104. For example, if the job information includes the planting of a new plant, the irrigation manager may generate irrigation instructions that include "watering in" the new plant, or instructing the local irrigation controller 102 to water the associated zone 104 for additional time to help the plant become established. The watering in may occur over a watering in period, which may be the period for the plant to become established and grow with the irrigation program.

In some embodiments, the irrigation instructions may include a different watering program for the zone 104 associated with the irrigation job. For example, if a new plant is planted, the irrigation instructions may include additional watering to water in the plant. In some examples, if the irrigation devices 106 are adjusted in a zone 104 (e.g., a new irrigation device 106 is added, removed, replaced), the irrigation instructions may include adjusting the watering schedule based on the adjusted irrigation devices 106. In some embodiments, the irrigation instructions may adjust the amount of water consumed by the zone 104. The irrigation instructions may include adjusting a stack of irrigation zones 104 based on the adjusted water consumption of the zone 104.

In some embodiments, the irrigation manager may transmit the irrigation instructions that are based on the irrigation job to the irrigation controllers 102. For example, the irrigation manager may transmit the irrigation instructions to the irrigation controller 102 associated with the job location 101 of the irrigation job. In some examples, the irrigation manager may transmit the irrigation instructions to the irrigation controller 102 associated with the zone 104 that the job location 101 is located in. In some examples, the irrigation manager may transmit the irrigation instructions to the irrigation controller 102 associated with the zone 104 associated with the irrigation job.

Figure 2:
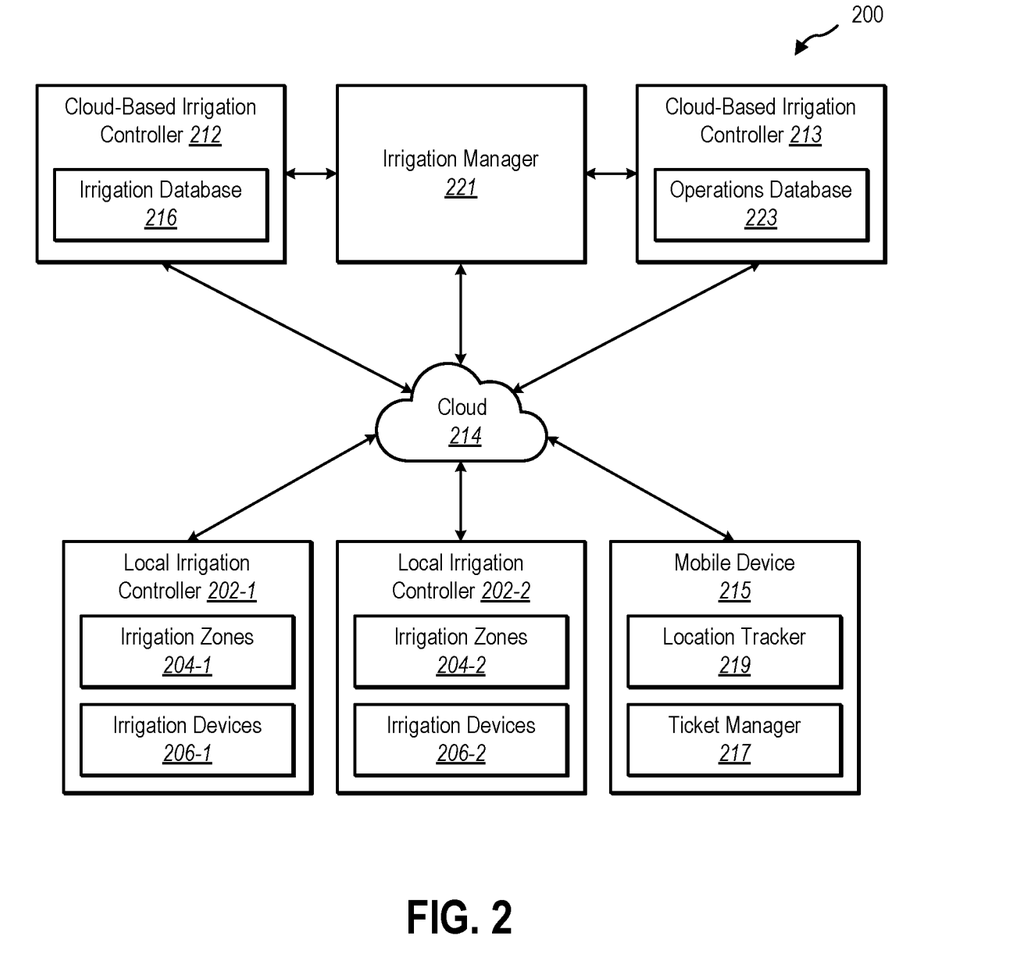
FIG. 2 is a schematic representation of a cloud-based irrigation system, according to at least one embodiment of the present disclosure.

FIG. 2 is a schematic representation of a cloud-based irrigation system 200, according to at least one embodiment of the present disclosure. The cloud-based irrigation system 200 may include a cloud-based irrigation controller 212. The cloud-based irrigation controller 212 may be connected to a plurality of local irrigation controllers (collectively 202). Put another way, the local irrigation controllers 202 may be tethered to the cloud-based irrigation controller 212. For example, a first local irrigation controller 202-1 and a second local irrigation controller 202-2 may be tethered to the cloud-based irrigation controller 212. While the embodiment shown includes two local irrigation controllers 202, it should be understood that the cloud-based irrigation system 200 may include any number of local irrigation controllers 202 tethered to the cloud-based irrigation controller 212.

The cloud-based irrigation system 200 may include a cloud-based operations controller 213. The cloud-based operations controller 213 may coordinate irrigation operations. For example, the cloud-based operations controller 213 may coordinate landscaping operations for a property. The cloud-based operations controller 213 may generate job tickets that provide instructions for operations crewmembers and/or operations crews to perform operations for the property. The job tickets may include irrigation jobs. For example, a job ticket may include planting a plant, installing an irrigation device, installing a sensor, installing irrigation piping, any other irrigation job, and combinations thereof.

In some embodiments, the cloud-based operations controller 213 may be in communication with a mobile device 215. The mobile device 215 may be used by the operations crewmember and/or operations crews onsite. The operations crews may receive and/or review job tickets using a ticket manager 217. The ticket manager 217 may receive job tickets from the cloud-based operations controller 213. The ticket manager 217 may display on the mobile device 215 the job information for the job. In some embodiments, as discussed herein, the job information may include information about an irrigation job. The operations crews may use the job information received from the ticket manager 217 on the mobile device 215 to perform the job.

The mobile device 215 may include a location tracker 219. The location tracker 219 may track the location of the mobile device 215. In some embodiments, the location tracker 219 may track the location of the mobile device 215. For example, the location tracker 219 may include a GPS antenna that may receive GPS signals from one or more GPS satellites. The location tracker 219 may determine a GPS location of the mobile device 215. In some embodiments, the location tracker 219 may be in communication with the ticket manager 217. For example, the location tracker 219 may transmit locations to the ticket manager 217. In some examples, the location tracker 219 may receive locations from the ticket manager 217. In some embodiments, the ticket manager 217 may provide the location tracker 219 with a job location of a job to be performed, and the operations crew may use the job location to find the appropriate location for the job in the job ticket.

In some embodiments, the location tracker 219 may periodically and/or episodically track the location of the mobile device 215. For example, the location tracker 219 may periodically track the location of the mobile device 215 with a frequency, such as 10 times per second, every 1 second, every 5 seconds, every 10 seconds, every 30 seconds, every 1 minute, every 5 minutes, every 10 minutes, every 30 minutes, every hour, or any time therebetween. In some examples, the location tracker 219 may episodically track the location of the mobile device 215 based on when a job is completed, a milestone is achieved in a particular job (e.g., a percentage milestone, a plant of a group of plants is planted, a subset of an irrigation job is completed), when the mobile device 215 receives an input from an operations crewmember, any other event, and combinations thereof. In some embodiments, the ticket manager 217 may associate the location from the location tracker 219 to a particular job ticket or irrigation job.

The cloud-based irrigation controller 212 and/or the cloud-based operations controller 213 may be located on the cloud 214. For example, the cloud-based irrigation controller 212 and/or the cloud-based operations controller 213 may be a remote application that is implemented on a virtual machine in a cloud-computing environment. The local irrigation controllers 202 may be connected to or tethered to the cloud-based irrigation controller 212 over the cloud 214. For example, the local irrigation controllers 202 may be in communication with the cloud-based irrigation controller 212 over the internet. In some embodiments, the mobile device 215 may be connected to the cloud-based operations controller 213 over the cloud 214.

The local irrigation controllers 202 may provide information to the cloud-based irrigation controller 212 over the cloud 214. For example, the local irrigation controllers 202 may, over the internet, provide information to the cloud 214 and the cloud-based irrigation controller 212 may be located on the cloud 214. In some embodiments, the cloud-based irrigation controller 212 may include an irrigation database 216. The cloud-based irrigation controller 212 may store the irrigation information provided by the local irrigation controllers 202 on the irrigation database 216.

The mobile device 215 may provide the cloud-based operations controller 213 with information over the cloud 214. For example, the mobile device 215 may, over the internet, provide information to the cloud 214 and the cloud-based operations controller 213 may be located on the cloud 214. In some embodiments, the cloud-based operations controller 213 may include an operations database 223. Job tickets, job information, job locations, operations crew information, and other operations information may be located on the operations database 223.

In some embodiments, the mobile device 215 may transmit job information and/or location information from the ticket manager 217 to the cloud-based operations controller 213. The cloud-based operations controller 213 may store the job information and/or location information on the operations database 223. In some embodiments, the cloud-based operations controller 213 may transmit job information and/or ticket information from the operations database 223 to the mobile device 215.

The irrigation information may include information from the irrigation zones (collectively 204) associated with the local irrigation controllers 202. A first irrigation zone 204-1 may be associated with the first local irrigation controller 202-1 and a second irrigation zone 204-2 may be associated with the second local irrigation controller 202-2. The local irrigation controllers 202 may divert or control water flow to one or more irrigation devices (collectively 206). The irrigation devices 206 may direct the water to the plants within the zone. First irrigation devices 206-1 may be associated with the first irrigation zone 204-1 and the first local irrigation controller 202-1 and second irrigation devices 206-2 may be associated with the second irrigation zone 204-2 and the second local irrigation controller 202-2.

The cloud-based irrigation controller 212 may provide the local irrigation controllers 202 with irrigation instructions. The irrigation instructions may provide instructions to control the operation of the local irrigation controllers 202. For example, the irrigation instructions may include the day, time of day, and/or duration of the watering of the irrigation zones, such as by controlling when the local irrigation controllers 202 open and close valves that divert water to the irrigation devices 206.

In accordance with at least one embodiment of the present disclosure, the cloud-based irrigation controller 212 may generate the irrigation instructions based on irrigation information stored in the irrigation database 216. For example, the cloud-based irrigation controller 212 may review the irrigation information on the irrigation database 216 to prepare the irrigation instructions. In some embodiments, the cloud-based irrigation controller 212 may review the irrigation information provided by two or more of the local irrigation controllers 202 to generate the irrigation instructions.

The irrigation instructions may be pushed to each local irrigation controller 202 individually. For example, the cloud-based irrigation controller 212 may generate a first set of irrigation instructions for the first local irrigation controller 202-1 and a second set of irrigation instructions for the second local irrigation controller 202-2. In some embodiments, the irrigation instructions associated with the local irrigation controllers 202 may be specific to each local irrigation controller 202. Put another way, the specific irrigation instructions may include instructions for only the irrigation zones 204 associated with the related local irrigation controller 202. In some embodiments, the irrigation instructions may include the instructions for each of the irrigation zones 204 associated with each local irrigation controllers 202. The local irrigation controller 202 may pull from the irrigation instructions the relevant irrigation instructions for its associated irrigation zones 204.

In some embodiments, the cloud-based irrigation controller 212 may assign one or more roles to the local irrigation controllers 202. For example, the cloud-based irrigation controller 212 may assign a role of a master local irrigation controller 202 based on control of a master valve to the water main. For example, a master valve may be a valve that controls water inflow from the water main to the various irrigation devices 206. In some embodiments, a master local irrigation controller 202 may control actuation of a master valve. In some embodiments, the master local irrigation controller 202 may open or close the master valve during watering of any zone 204 from any local irrigation controller 202. In some embodiments, the master local irrigation controller 202 may have the entire watering program for the cloud-based irrigation system 200 to control the opening of the master valve. In some embodiments, multiple local irrigation controllers 202 may be designated a master irrigation controller 202. In some embodiments, the cloud-based irrigation system 200 may include multiple master valves controlled by a single master local irrigation controller 202. In some embodiments, multiple master valves may be controlled by multiple master local irrigation controllers. In some embodiments, a single master valve may be controlled by multiple master local irrigation controllers.

In accordance with at least one embodiment of the present disclosure, the cloud-based irrigation controller 212 may implement new features or programs on the local irrigation controllers 202. The cloud-based irrigation controller 212 may push updates to the local software or operating system of the local irrigation controllers 202. This may allow the local irrigation controllers 202 to implement the updated features or programs without replacing any of the hardware components of the local irrigation controllers 202. This may allow the local irrigation controllers 202 to control new types of irrigation devices 206, new sensors (e.g., sensors 110 of the cloud-based irrigation system 100 of FIG. 1), implement new automatic shutoff conditions, implement any other type of update, and combinations thereof. Conventionally, to implement new updates, the local irrigation controllers 202 may be replaced. By tethering the local irrigation controllers 202 to the cloud-based irrigation controller 212, the cloud-based irrigation controller 212 may implement new updates without replacing the hardware of the local irrigation controllers 202, thereby reducing the cost and increasing the speed and ease of implementation of the updates.

The cloud-based irrigation system 200 may include an irrigation manager 221. The irrigation manager 221 may be in communication with the cloud-based irrigation controller 212 and the cloud-based operations controller 213. In some embodiments, the irrigation manager 221 may review operations information provided by the cloud-based operations controller 213 and irrigation information provided by the cloud-based irrigation controller 212. In some embodiments, based on the job information and the irrigation information, the irrigation manager 221 may generate irrigation instructions for the local irrigation controllers 202. This may allow the irrigation manager 221 to integrate operations information with the cloud-based irrigation controller 212. In this manner, the irrigation manager 221 may help to reduce or prevent damage to the cloud-based irrigation system 200 caused by a failure to accommodate operations information.

In some embodiments, the irrigation manager 221 may associate job information from the operations database 223 with a particular irrigation zone 204 from the irrigation database 216. For example, the irrigation manager 221 may receive job information for an irrigation job from the operations database 223. The job information may include location information for the irrigation job. Based on the job information and/or the location information, the irrigation manager 221 may associate the irrigation job with a particular irrigation zone 204. Based on the job information and/or the irrigation information, the irrigation manager 221 may provide irrigation information to the associated local irrigation controller 202. In this manner, the irrigation manager 221 may help to reduce or prevent damage to the cloud-based irrigation system 200.

In some embodiments, the irrigation manager 221 may associate the irrigation job with the appropriate irrigation zone 204 using the location information. For example, the irrigation manager 221 may associate the irrigation job with the appropriate irrigation zone 204 based on the GPS information from the location information.

In some embodiments, the irrigation manager 221 may associate the irrigation job with the irrigation zone using the job information. For example, the job information may include in which irrigation zone the irrigation job is located. In some examples, the job information may include a map of the irrigation piping, and the irrigation manager 221 may associate the irrigation job with a particular zone based on where, in the map of the irrigation piping, the irrigation job is located.

In some embodiments, the irrigation manager 221 may generate temporary irrigation instructions. For example, the irrigation manager 221 may generate irrigation instructions that are implemented during a watering in period. In some examples, the irrigation manager 221 may generate irrigation instructions that are implemented until overridden by an irrigation operator and/or the cloud-based irrigation controller 212. In some examples the irrigation manager 221 may generate irrigation instructions that are temporarily implemented in any other situation.

In some embodiments, the irrigation manager 221 may generate changes to the irrigation program for the local irrigation controllers 202. For example, the irrigation manager 221 may generate a change to the watering time, the watering priority, the watering stack, or other change to the irrigation program for the local irrigation controllers 202.

In some embodiments, the irrigation manager 221 may directly communicate the new irrigation instructions to the local irrigation controllers 202. For example, the irrigation manager 221 may communicate the new irrigation instructions directly to the local irrigation controller 202 associated with the irrigation zone 204 in which the irrigation job was performed.

In some embodiments, the irrigation manager 221 may provide the new irrigation instructions to the cloud-based irrigation controller 212. The cloud-based irrigation controller 212 may send the new irrigation instructions to the local irrigation controllers 202, as discussed herein. In some embodiments, the cloud-based irrigation controller 212 may review the new irrigation instructions. The cloud-based irrigation controller 212 may revise the new irrigation instructions based on the irrigation information in the irrigation database 216. For example, the cloud-based irrigation controller 212 may revise the new irrigation instructions based on moisture levels in the soil.

The irrigation manager 221 may be in communication with one or both of the cloud-based irrigation controller 212 and the cloud-based operations controller 213. For example, the irrigation manager 221 may be in communication over the cloud 214 with the cloud-based operations controller 213 to receive job information and/or location information about an irrigation job. The irrigation manager 221 may be in communication over the cloud 214 with the cloud-based irrigation controller 212 to receive irrigation information about the irrigation zones 204.

In some embodiments, the irrigation manager 221 may receive one or more notifications from the cloud-based irrigation controller 212, the cloud-based operations controller 213, the mobile device 215, and other elements of the cloud-based irrigation system 200. In some embodiments, based on these notifications, the irrigation manager 221 may review the job information, the job location, and/or the irrigation information to determine whether to make a change to an irrigation program.

As a specific non-limiting example, the irrigation manager 221 may receive a job status notification from the mobile device 215. The job status notification from the mobile device 215 may include an indication from the mobile device 215 that an irrigation job has been completed and/or that a portion of an irrigation job has been completed. In some embodiments, the job status notification may include a status of a job, including new job information. The job status notification may include job information and/or a job location from the mobile device 215. The irrigation manager 221 may use the job information and/or job location to determine new and/or temporary irrigation instructions for the irrigation zone.

In some embodiments, the cloud-based operations controller 213 and the cloud-based irrigation controller 212 may be separate systems. For example, the cloud-based operations controller 213 and the cloud-based irrigation controller 212 may be separate cloud-based programs, operated on separate cloud-based servers. This may result in the operations database 223 and the irrigation database 216 being separate databases. In some embodiments, the cloud-based operations controller 213 and the cloud-based irrigation controller 212 may be located on the same server. For example, the cloud-based operations controller 213 and the cloud-based irrigation controller 212 may be part of the same program. The operations database 223 and the irrigation database 216 may be separate databases within the same program. In some examples, the operations database 223 and the irrigation database 216 may be part of the same database within the program.

In some embodiments, the irrigation manager 221 may be a part of the cloud-based operations controller 213. For example, the irrigation manager 221 may be an app or other program implementable within the cloud-based operations controller 213. In some embodiments, the irrigation manager 221 may be part of the cloud-based irrigation controller 212. For example, the irrigation manager 221 may be an app or other program implementable within the cloud-based irrigation controller 212. In some embodiments, the irrigation manager 221 may be an independent program in communication with both the cloud-based irrigation controller 212 and the cloud-based operations controller 213.

In some embodiments, the irrigation manager 221 may receive information directly from the mobile device 215 and the local irrigation controllers 202. This may allow the irrigation manager 221 to independently implement new irrigation instructions. In some embodiments, the irrigation manager 221 may not be in direct communication with the mobile device 215. For example, the irrigation manager 221 may receive job information and/or location information from the cloud-based operations controller 213 and the irrigation manager 221 may receive irrigation information from the cloud-based irrigation controller 212. In some embodiments, the irrigation manager 221 may communicate the new irrigation instructions to the local irrigation controllers 202 and/or the mobile device 215 through the cloud-based irrigation controller 212 and/or the cloud-based operations controller 213. This may help to simplify the communication pathways between the mobile device 215 and/or the local irrigation controllers 202.

In some embodiments, the irrigation manager 221 may transmit the new irrigation instructions to the mobile device 215. In some embodiments, the new instructions transmitted to the mobile device 215 may include a confirmation request. For example, the irrigation manager 221 may request confirmation of the new instructions by the operations crewmember. Upon receipt of approval of the confirmation request, the irrigation manager 221 may transmit the new irrigation instructions to the local irrigation controllers 202.

In some embodiments, the irrigation manager 221 may receive work schedules of an operations crew and/or a plurality of irrigation crews from the cloud-based operations controller 213. The work schedules may include where an operations crew may be at a particular time, when a particular irrigation job is scheduled to be performed, where the irrigation job is scheduled to be performed, behavioral patterns of the operations crew, any other work schedule information, and combinations thereof.

The irrigation manager 221 may receive the irrigation information from the cloud-based irrigation controller 212. For example, the irrigation manager 221 may receive sensor information, irrigation programs, irrigation stacks, irrigation zone 204 locations, associations between irrigation zones 204 and local irrigation controllers 202, any other irrigation information, and combinations thereof.

In some embodiments, the irrigation manager 221 may provide one or more irrigation instructions based on one or both of the work schedule and the irrigation information. For example, the irrigation manager 221 may determine that the operations crew may perform work within a particular irrigation zone at a particular time. The irrigation manager 221 may adjust the actuation of the zone so that actuation of the zone does not impact the irrigation job. For example, the irrigation manager 221 may prevent the actuation of the irrigation zone for a period before and/or during the irrigation job. This may help to prevent the soil from being too wet to perform the irrigation job. In some examples, the irrigation manager 221 may actuate the irrigation zone prior to performing the irrigation job. This may help to pre-soak the ground, thereby improving the success of planting a particular plant. In this manner, the irrigation manager 221 may help to coordinate irrigation and operations, thereby improving the efficiency of operation of the cloud-based irrigation system 200.

In some embodiments, the irrigation manager 221 may adjust the job ticket for an irrigation job based on the irrigation information. The irrigation manager 221 may adjust the job ticket to change the time of an irrigation job. For example, the irrigation manager 221 may adjust the time of an irrigation job to prevent the actuation of an irrigation zone 204 from overlapping with the performance of the irrigation job. In some embodiments, the irrigation manager 221 may adjust the job ticket to change the time of a job to match an operations crew's schedule.

In some embodiments, the irrigation manager 221 may prepare a job ticket for the operations crew to perform. For example, the irrigation manager 221 may prepare a job ticket for the operations crew to repair or replace one or more of the irrigation devices 206 based on sensor information that is indicative of a damaged irrigation device 206. In some examples, the irrigation manager 221 may prepare a job ticket to manually inspect a particular zone. For example, the irrigation manager 221 may prepare a job ticket based on sensor data that indicates a plant may be in low health, and the job ticket may be to inspect the plant to diagnose the problem of the plant.

Figure 3:
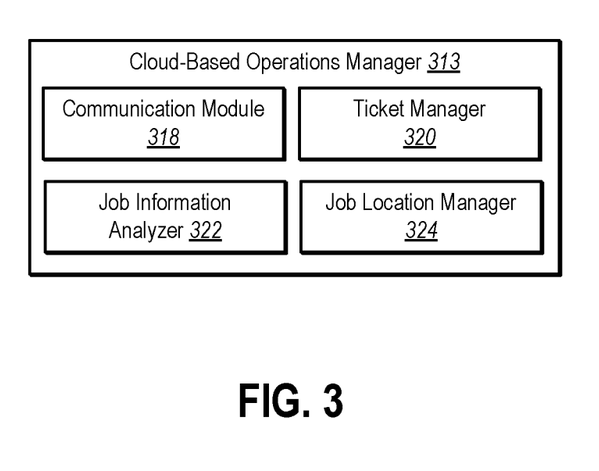
FIG. 3 is a schematic representation of a cloud-based operations controller, according to at least one embodiment of the present disclosure.

FIG. 3 is a schematic representation of a cloud-based operations controller 313, according to at least one embodiment of the present disclosure. Each of the components of the cloud-based operations controller 313 can include software, hardware, or both. For example, the components can include one or more instructions stored on a computer-readable storage medium and executable by processors of one or more computing devices, such as a client device or server device. When executed by the one or more processors, the computer-executable instructions of the cloud-based operations controller 313 can cause the computing device(s) to perform the methods described herein. Alternatively, the components can include hardware, such as a special-purpose processing device to perform a certain function or group of functions. Alternatively, the components of the cloud-based operations controller 313 can include a combination of computer-executable instructions and hardware.

Furthermore, the components of the cloud-based operations controller 313 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The cloud-based operations controller 313 may in communication with one or more mobile devices. The cloud-based operations controller 313 may provide job tickets and/or job information to the mobile device. The cloud-based operations controller 313 may include a communication module 318. The communication module 318 may communicate with the connected mobile device. For example, the communication module 318 may communicate with the connected mobile device over the internet. In some examples, the communication module 318 may communicate with the connected mobile device over a wireless network, such as WiFi or a cellular network. Put another way, the communication module 318 may wirelessly connect over the internet with the connected mobile device.

In some embodiments, the cloud-based operations controller 313 may include a ticket manager 320. The ticket manager 320 may control the generation and/or distribution of job tickets to the mobile devices of the operation crews. For example, the ticket manager 320 may receive a request to generate a job ticket from an irrigation operator. The ticket manager 320 may generate the job ticket and the communication module 318 may send the job ticket to the mobile device.

In some embodiments, the ticket manager 320 may receive notifications of when an irrigation job is complete, or when an update on an irrigation job is received. For example, the operations crew may input on the mobile device when a particular irrigation job is complete or when they complete a portion of the irrigation job. The ticket manager 320 may receive the input of the completion or partial completion. In some embodiments, the ticket manager 320 may receive a location of the mobile device when the irrigation job is completed.

The cloud-based operations controller 313 may include a job information analyzer 322. The job information analyzer 322 may review job information for job tickets from the ticket manager 320. For example, the job information analyzer 322 may analyze the job information including the job type, planned location, actual location, crew size, crew composition, and so forth.

The cloud-based operations controller 313 may include a job location manager 324. The job location manager 324 may review job location information from irrigation jobs. In some embodiments, the ticket manager 320 may receive job location information from the mobile device with every update to the job. In some embodiments, the job location manager 324 may prepare a request for a job location for a particular irrigation job or portion of an irrigation job. The ticket manager 320 may transmit the location request to the mobile device through the communication module 318. In this manner, the job location manager 324 may receive a job location for a particular irrigation job or portion of an irrigation job.

Figure 4:
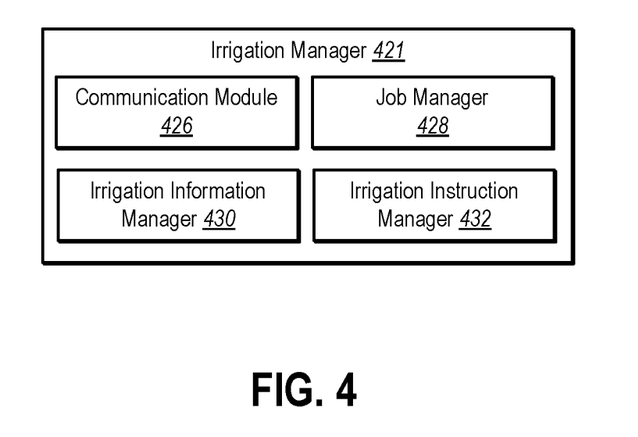
FIG. 4 is a schematic representation of an irrigation manager, according to at least one embodiment of the present disclosure.

FIG. 4 is a schematic representation of an irrigation manager 421, according to at least one embodiment of the present disclosure. Each of the components of the irrigation manager 421 can include software, hardware, or both. For example, the components can include one or more instructions stored on a computer-readable storage medium and executable by processors of one or more computing devices, such as a client device or server device. When executed by the one or more processors, the computer-executable instructions of the irrigation manager 421 can cause the computing device(s) to perform the methods described herein. Alternatively, the components can include hardware, such as a special-purpose processing device to perform a certain function or group of functions. Alternatively, the components of the irrigation manager 421 can include a combination of computer-executable instructions and hardware.

Furthermore, the components of the irrigation manager 421 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The irrigation manager 421 may include a communication module 426. The communication module 426 may be in communication with a cloud-based irrigation controller and/or a cloud-based operations controller. The irrigation manager 421 may receive from the cloud-based irrigation controller and the cloud-based operations controller information regarding a cloud-based irrigation system. In some embodiments, the irrigation manager 421 may be in communication with one or more mobile devices and/or irrigation controllers.

The irrigation manager 421 may include a job manager 428. The job manager 428 may receive job information and/or job location information from a cloud-based operations controller. For example, as discussed herein, the job manager 428 may receive job location information associated with a particular irrigation job. In some embodiments, the job manager 428 may request location information from a mobile device that is associated with a particular job.

The irrigation manager 421 may further include an irrigation information manager 430. The irrigation information manager 430 may receive irrigation information from a cloud-based irrigation controller. The irrigation information may include irrigation information about one or more irrigation zones associated with a local irrigation controller, such as watering time of day, watering duration, watering stacks, sensor measurements, irrigation zone location, local irrigation controller location, any other irrigation information, and combinations thereof.

In some embodiments, and as discussed in further detail herein, the irrigation manager 421 may include an irrigation instruction manager 432. The irrigation instruction manager 432 may generate irrigation instructions for one or more irrigation zones based on one or more of the job information, the job location, or the irrigation information. In this manner, the irrigation manager 421 may help to improve the operation of the cloud-based irrigation system by reducing or preventing damage to components of the cloud-based irrigation system.

Figure 5:
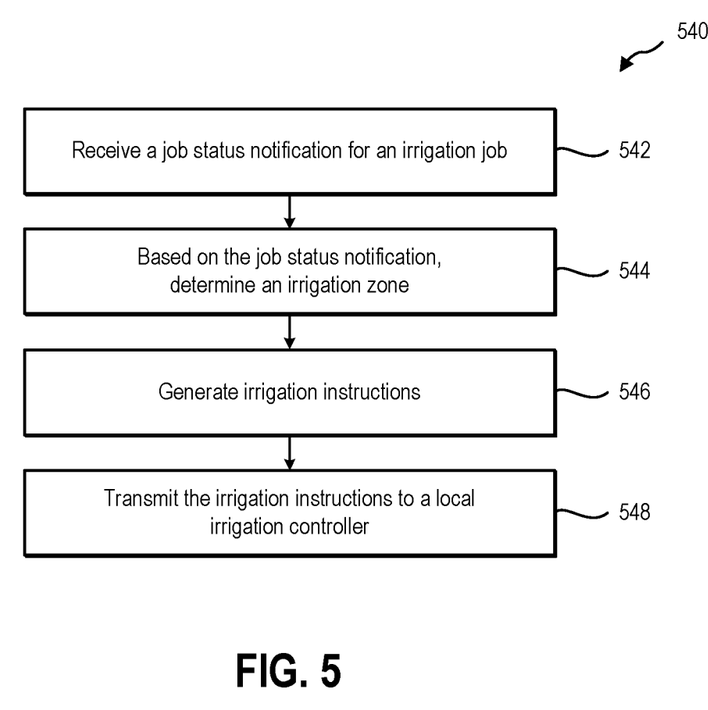
FIG. 5 is a flowchart of a method for irrigation control, according to at least one embodiment of the present disclosure.
Figure 6:
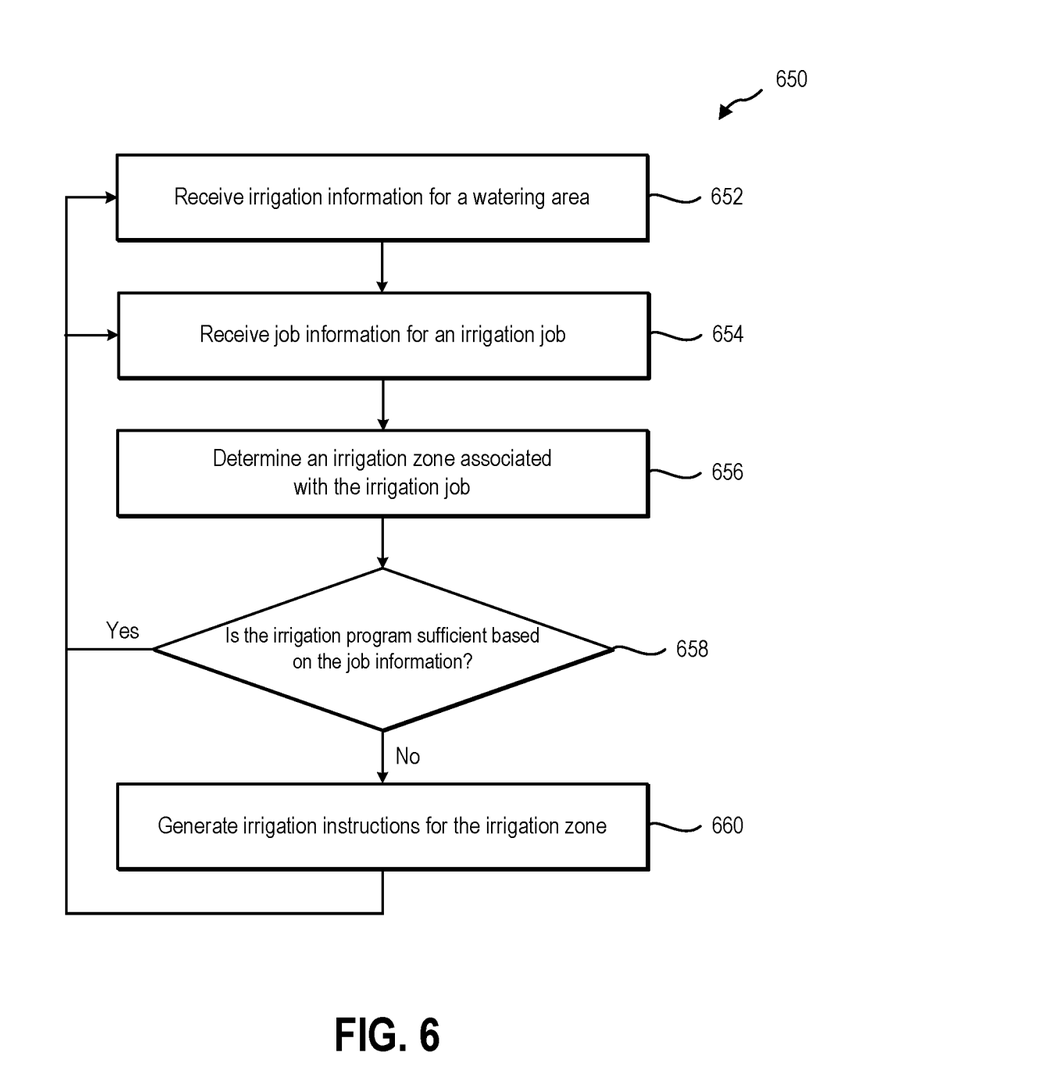
FIG. 6 is a flowchart of a method for irrigation control, according to at least one embodiment of the present disclosure.

FIGS. 5 and 6, the corresponding text, and the examples provide a number of different methods, systems, devices, and non-transitory computer-readable media of the cloud-based irrigation system. In addition to the foregoing, one or more embodiments can also be described in terms of flowcharts comprising acts for accomplishing a particular result, as shown in FIGS. 5 and 6. FIGS. 5 and 6 may be performed with more or fewer acts. Further, the acts may be performed in differing orders. Additionally, the acts described herein may be repeated or performed in parallel with one another or parallel with different instances of the same or similar acts.

As mentioned, FIG. 5 illustrates a flowchart of a method 540 of a series of acts for irrigation control, according to at least one embodiment of the present disclosure. While FIG. 5 illustrates acts according to one embodiment, alternative embodiments may omit, add to, reorder, and/or modify any of the acts shown in FIG. 5. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 5. The method 540 illustrated in FIG. 6 may be implemented by the irrigation manager 421 shown in FIG. 4. Put another way, the irrigation manager 421 of FIG. 4 may implement the method 540 of FIG. 5.

The irrigation manager may receive a job status notification for an irrigation job at 542. The job status notification may be received from a mobile device. The job status notification may include job information and location information for the irrigation job.

Based on the job status notification, the irrigation manager may determine, within the watering area, an irrigation zone associated with a local irrigation controller in which the job is located at 544. For example, the irrigation manager may determine the irrigation zone based on location information including a GPS location. In some examples, the GPS location may be the GPS location of the irrigation job. In some examples, the GPS location may be the GPS location of the work performed in the irrigation job. For example, the GPS location may be the GPS location of the plant planted, the irrigation device installed, the valve installed, or the GPS location of any other portion of the irrigation job. In some embodiments, the GPS location may be the GPS location of the mobile device while the job is performed. In some embodiments, the irrigation manager may determine the irrigation zone in which the job is located based on the GPS location being within the irrigation zone.

In some embodiments, based on the job information, the irrigation manager may generate instructions for the irrigation zone at 546. For example, the irrigation manager may generate instructions that are tailored to a specific job, such as delaying watering, watering more, adjusting water consumption, any other irrigation instructions, and combinations thereof. In some embodiments, generating the irrigation instructions may include generating a temporary irrigation program for the irrigation zone based on the job information. In some embodiments, the irrigation manager may transmit or send the irrigation instructions to the local irrigation controller at 548. In some embodiments, the irrigation manger may cause the local irrigation controller to implement the irrigation instructions.

As mentioned, FIG. 6 illustrates a flowchart of a method 650 of a series of acts for irrigation control, according to at least one embodiment of the present disclosure. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6. The method 650 illustrated in FIG. 6 may be implemented by the irrigation manager 421 shown in FIG. 4. Put another way, the irrigation manager 421 of FIG. 4 may implement the method 650 of FIG. 6.

The irrigation manager may receive irrigation information for a watering area at 652. For example, as discussed herein, the irrigation manager may receive the irrigation information for a plurality of local irrigation controllers tethered to a cloud-based irrigation controller. The irrigation information may include irrigation information for the irrigation zones associated with the local irrigation controllers. In some embodiments, the irrigation manager may receive irrigation information as it is updated. For example, the irrigation manager may receive sensor information as the sensor information is collected. In some examples, the irrigation manager may receive watering times and durations of the irrigation zones.

In some embodiments, the irrigation manager may receive job information for an irrigation job at 654. In some embodiments, the irrigation manager may receive job location information for the irrigation job. The job information may include the type of job performed, the type of plant planted, the type of irrigation device installed, an associated irrigation zone, any other job information, and combinations thereof.

In some embodiments, the irrigation manager may determine an irrigation zone associated with the irrigation job at 656. For example, using the location information, the irrigation manager may determine in which irrigation zone the irrigation job was performed.

The irrigation manager may determine 658 whether the irrigation program is sufficient. For example, the irrigation manager may determine whether the irrigation program is sufficient based on the job information. In some examples, the job information may include a planted plant. Based on the type of plant planted, the irrigation manager may determine whether the watering program in the zone in which the plant is planted is sufficient to allow the plant to become established and/or grow. In some examples, the job information may include an irrigation device installed, repaired, or replaced. The irrigation manager may review the specifications of the irrigation device and determine whether the irrigation program provides the appropriate amount of water to the irrigation zone using that irrigation device.

In some examples, the irrigation manager may determine whether the irrigation program is appropriate based on a particular job. For example, as discussed herein, the irrigation manager may determine whether the irrigation program will interfere with the performance with the irrigation job. The irrigation manager may adjust the irrigation program so that the irrigation program does not interfere with the performance of the irrigation job.

If the irrigation program is sufficient and/or appropriate, then the irrigation manager may continue to receive irrigation information and/or job information. For example, the irrigation manager may monitor the irrigation information for changes. The changes in the irrigation information may change whether the irrigation program is sufficient based on the job information. In some examples, the irrigation manager may monitor the job information for the irrigation job. As the irrigation manager observes changes to the job information, the irrigation manager may continue to determine whether the irrigation is sufficient and/or appropriate based on the updated job information.

If the irrigation program is not sufficient and/or not appropriate, the irrigation manager may generate irrigation instructions for the irrigation zone and/or the irrigation controller at 660. For example, as discussed herein, the irrigation manager may prepare adjusted irrigation instructions that accommodate the new job information. In some embodiments, as discussed herein, the irrigation manager may adjust one or more job tickets based on the irrigation program.

Figure 7:
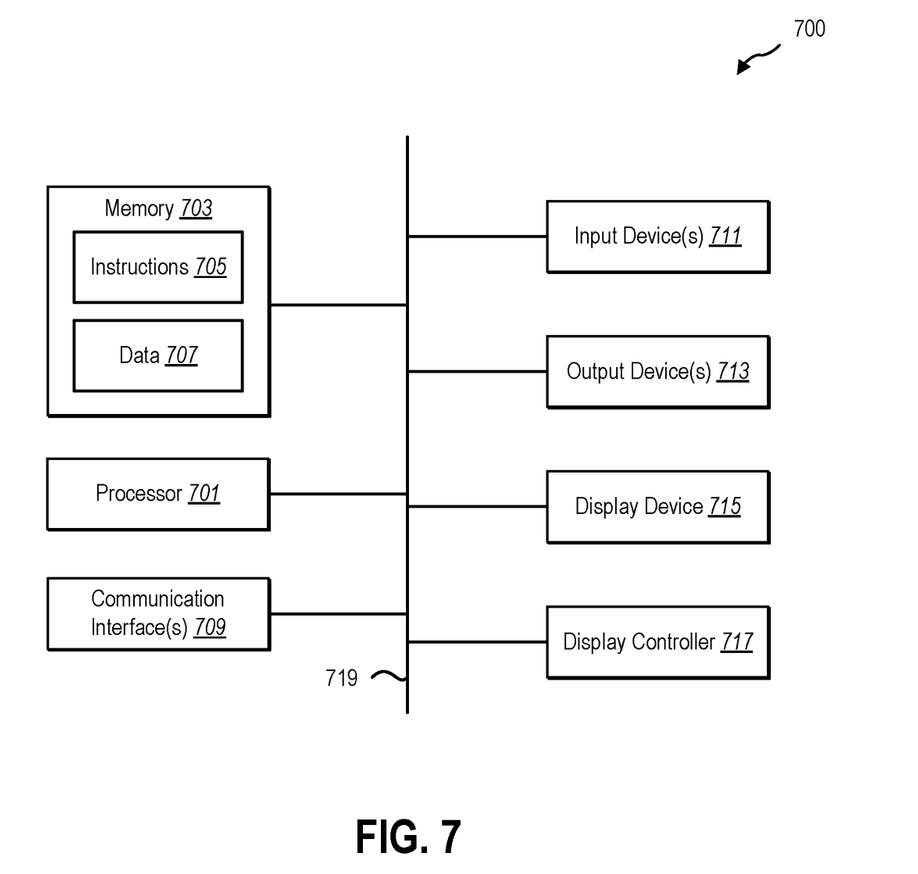
FIG. 7 illustrates certain components that may be included within a computer system 700.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth© wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for irrigation control implemented on an irrigation manager, the method comprising:
   receiving, at the irrigation manager from a remote computing device, a job status notification for a job within a watering area, the job status notification including job information comprising a change in at least one of a type of the job within the watering area, an irrigation device within the watering area, or a plant type within the watering area;
   based on the job status notification, determining, within the watering area, an irrigation zone associated with a local irrigation controller in which the job is located;
   based on the job information, generating, as the change occurs, irrigation instructions for the irrigation zone; and
   transmitting the irrigation instructions from the irrigation manager to the local irrigation controller.

2. The method of claim 1, further comprising implementing the irrigation instructions.

3. The method of claim 1, wherein;
   the job status notification includes at least one of the job information or location information;
   generating the irrigation instructions for the irrigation zone is based on at least one of the job information or the location information; and
   the location information includes a GPS location.

4. The method of claim 3, wherein the GPS location is of the remote computing device.

5. The method of claim 4, wherein the GPS location of the remote computing device is collected while the job is performed.

6. The method of claim 5, wherein determining the irrigation zone includes determining that the GPS location is within the irrigation zone.

7. The method of claim 1, wherein generating the irrigation instructions includes generating a temporary irrigation program for the irrigation zone based on the job information.

8. An irrigation manager, comprising:
   a processor and memory, the memory including instructions which cause the processor to:
   receive, at the irrigation manager from a remote computing device, a job status notification for a job within a watering area, the job status notification including job information and location information, the job information including a type of the job;
   based on the job status notification, determine, within the watering area, an irrigation zone associated with a local irrigation controller in which the job is located;
   based on a change in at least one of the job information or the location information, generate irrigation instructions for the irrigation zone as the change occurs; and transmit the irrigation instructions from the irrigation manager to the local irrigation controller.

9. The irrigation manager of claim 8, wherein the instructions further cause the processor to implement the irrigation instructions.

10. The irrigation manager of claim 8, wherein the location information includes a GPS location.

11. The irrigation manager of claim 10, wherein the GPS location is of the remote computing device.

12. The irrigation manager of claim 11, wherein the GPS location of the remote computing device is collected while the job is performed.

13. The irrigation manager of claim 12, wherein determining the irrigation zone includes determining that the GPS location is within the irrigation zone.

14. The irrigation manager of claim 8, wherein generating the irrigation instructions includes generating a temporary irrigation program for the irrigation zone based on the job information.

15. A method for irrigation control implemented on an irrigation manager, the method comprising:
  receiving, at the irrigation manager from a cloud-based irrigation controller, irrigation information for a plurality of irrigation zones in a watering area;
  receiving, at the irrigation manager from a remote computing device, job information for an irrigation job in the watering area, the job information including at least one of:
  a type of the irrigation job; or
  a change in an irrigation device within the watering area;
  based on the irrigation information and the job information, determining an irrigation zone of the plurality of irrigation zones in which the irrigation job is performed;
  based on the irrigation information and the job information, determine whether an irrigation program for the irrigation zone is sufficient; and
  if the irrigation program is not sufficient, generating irrigation instructions for the irrigation zone.

16. The method of claim 15, wherein the job information includes location information for the remote computing device, the location information including a GPS location of the remote computing device during the irrigation job.

17. The method of claim 15, wherein the job information includes a work schedule, and wherein the irrigation instructions include adjusting a time of day of actuation of the irrigation zone based on the work schedule.

18. The method of claim 15, further comprising:
  transmitting the irrigation instructions to an irrigation controller associated with the irrigation zone; and
  instructing the irrigation controller to implement the irrigation instructions in the irrigation zone.

19. The method of claim 15, wherein the irrigation program is not sufficient if actuation of the irrigation zone interferes with the irrigation job.

20. The method of claim 15, wherein the irrigation instructions include watering in a new plant.

* * * * *